United States Patent [19]

Sandler et al.

[11] 4,307,010
[45] Dec. 22, 1981

[54] ZEOLITES AS SMOKE SUPPRESSANTS FOR HALOGENATED POLYMERS

[75] Inventors: Stanley R. Sandler, Springfield; John C. Wetzel, Norristown, both of Pa.

[73] Assignee: Pennwalt Corporation, Philadelphia, Pa.

[21] Appl. No.: 112,962

[22] Filed: Jan. 17, 1980

[51] Int. Cl.³ .............................................. C08K 3/34
[52] U.S. Cl. ............................ 260/42.47; 260/42.49; 260/45.75 R; 260/45.75 P; 260/45.75 G; 260/45.75 C; 260/45.75 N; 260/45.75 W; 260/45.75 B
[58] Field of Search .......... 260/42.47, 42.49, 45.75 R, 260/45.75 P, 45.75 G, 45.75 C, 45.75 N, 45.75 W, 45.75 B, DIG. 16, 28.5 D

[56] References Cited

U.S. PATENT DOCUMENTS

| | | | |
|---|---|---|---|
| 2,575,686 | 11/1951 | Simon | 260/42.49 |
| 2,867,605 | 1/1959 | Safford | 260/45.75 V |
| 3,245,946 | 4/1966 | O'Connor et al. | 260/42.49 |
| 3,903,028 | 9/1975 | Mitchell | 260/45.75 |
| 3,953,565 | 4/1976 | Mizutani et al. | 260/37 PC |
| 3,993,607 | 11/1976 | Florence | 260/2.5 |
| 4,000,100 | 12/1976 | Baldyga | 260/23 XA |
| 4,123,587 | 10/1978 | Wesch et al. | 260/45.7 PH |

FOREIGN PATENT DOCUMENTS 50-56474  5/1975  Japan .
1092600 11/1967  United Kingdom .

OTHER PUBLICATIONS

CA, 84, 12,2710m, (1976).

Primary Examiner—V. P. Hoke

[57] ABSTRACT

Zeolites and metal-ion exchanged zeolite are used to impart smoke suppressant characteristics to halogenated polymers.

15 Claims, No Drawings

ZEOLITES AS SMOKE SUPPRESSANTS FOR HALOGENATED POLYMERS

BACKGROUND OF THE INVENTION

This invention relates to the use of zeolites and ion exchanged zeolites as smoke suppressants for halogenated polymers.

Smoke, especially dense smoke, is a hazard during a fire since it can obscure means of escape, cause panic, and hamper fire fighting measures. Hence, it is desirable to develop building materials which emit reduced amounts of smoke during combustion as an added safety feature. The composition of the present invention meets this requirement.

In the prior art, certain zeolites have been disclosed for use in polyvinyl chloride (PVC). U.S. Pat. No. 4,000,100 discloses the use of unactivated zeolites in conjunction with a second stabilizing component for improving PVC processability. U.S. Pat. No. 2,867,605 discloses the use of zeolites containing cadmium, barium, lead, strontium or tin for stabilization of PVC. U.S. Pat. No. 3,953,565 teaches the use of zeolites in highly filled thermoplastic resins including PVC to impart flame retardancy. Although certain zeolites have been used as additives for thermal stabilization and flame retardancy in PVC, this does not suggest that certain zeolites could be used to provide smoke suppressant activity, as is well known to those skilled in the art. Zeolite compositions have not been disclosed in the prior art as smoke suppressants for halogenated polymers or any other resins.

STATEMENT OF THE INVENTION

The present invention is directed to a composition comprising 100 parts by weight of a halogenated polymer and 0.1 to 30 parts by weight of a smoke suppressant selected from the group consisting of zeolites and metal-ion exchanged zeolites, both naturally occurring and synthetic, and mixtures thereof, represented by the general formula

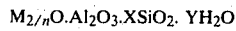

$$M_{2/n}O \cdot Al_2O_3 \cdot XSiO_2 \cdot YH_2O$$

wherein

M is a metal, such as alkali and alkaline earth metals, V, Mo, Mn, Fe, Co, Ni, Cu, Zn, Sb, Bi and mixtures thereof;

n is the cation valence;

X lies between 0.1 and 20 inclusive;

Y is the number of moles of water of crystallization and has a value of 0 to 20.

Definitions

Representative zeolite compositions useful in the practice of this invention are those based on, but not limited to, the naturally occurring zeolites analcite, analcime, cancrinite, chabazite, clinoptilolite, erionite, faujacite, heulandite, mordenite, nosean, phillipsite, and stilbite; various synthetic alumino silicates; and metal ion-exchanged derivatives of both natural and synthetic zeolites by such metals as V, Mo, Mn, Fe, Co, Ni, Cu, Zn, Sb, Bi, and mixtures thereof. Examples of natural zeolites found suitable for this invention include chabazite, clinoptilolite, erionite, mordenite, available as ZEOLITE 5050, ZEOLITE 1010, ZEOLITE 3030, ZEOLITE 2020, and ZEOLITE 4040 respectively from the Anaconda Company and Clinoptilolite and Phillipsite from Double Eagle Petroleum and Mining Company. Examples of synthetic zeolites are ZEOLEX 7, ZEOLEX 23A, ZEOLEX 80, and AROGEN 2000 from the J. M. Huber Corp., Ethyl Corporation's EZA, molecular sieves from Davison, and Union Carbide's LINDE AW 300, LINDE AW 400, LINDE AW 500, LINDE A, ZK-4, LINDE F, HYDROXY-SODALITE (HS), LINDE B, LINDE T, LINDE X, LINDE Y, IONSIV X-60, IONSIV X-61, IONSIV Y-70, IONSIV F-80, IONSIV A-50, IONSIV A-51, and IONSIV IE-95.

Preferred zeolites for the practice of this invention are the naturally occurring zeolites chabazite, clinoptilolite, erionite, mordenite, and phillipsite and ion-exchanged derivatives thereof; and ion-exchanged derivatives of the synthetic zeolites EZA and ZEOLEX 7.

For the purposes of this invention, ion-exchanged zeolites are zeolite compositions in which partial to complete replacement of the alkali and alkaline earth metal ion component of the aluminosilicate structure has been effected. Depending on the atomic weight of the exchanging metal, therefore, this new metal component may comprise from 1% up to about 30% of the formula weight of the ion-exchanged zeolite, although it will most frequently comprise below 20% of the overall formula weight.

Ion-exchanged zeolites may be produced by stirring a mixture of the zeolite in an aqueous solution containing a water-soluble salt of the desired metal. In certain instances, it is preferable to stir the zeolite in a concentrated solution of sodium chloride in order to exchange sodium for the difficultly released potassium, calcium, and magnesium ions and then to effect further exchange of the sodium ions in a solution of the desired metal ion. Excellent results are obtained when the exchange is made at temperatures of 20°–100° C., and more preferably between 40° and 80° C.

Preferred metals of this invention are selected from the group consisting of V, Mo, Mn, Fe, Co, Ni, Cu, Zn, Sb, Bi, and mixtures thereof.

Particularly preferred are the metals selected from the group consisting of V, Mo, Mn, Fe, Co, Cu, Zn, and Bi, and mixtures thereof.

The utility of these compositions may be further improved by calcining at 200°–700° C. for a period of 1–10 hours, and preferably at 300°–500° C. for a period of 2–5 hours.

The compositions of this invention can be used in combination with other additives such as plasticizers, antioxidants, stabilizers, pigments, fillers, flame retardants, and smoke suppressants. The compositions of this invention can also be used in combination with metal oxides and carbonates, such as those of Fe, Mn, Mg, Co, Cu, Mo, Ni, Zn, and Bi. In particular, an unexpected synergistic reduction in smoke was found when the zeolite compositions of this invention were used in combination with 0.1–10 parts $CuCO_3$ (U.S. Pat. No. 4,157,329), 0.1–10 parts $MoO_3$ (U.S. Pat. No. 3,870,679), or mixtures thereof, both $CuCO_3$ and $MoO_3$ being known smoke suppressants.

A variety of halogenated polymers can be used in this invention, including the homopolymers poly(vinyl chloride), poly(vinyl bromide), poly(vinyl fluoride), poly(vinylidene chloride), poly(vinylidene fluoride), and the like; copolymers such as poly(vinyl chloride-vinyl acetate), poly(vinyl chloride-vinylidene chloride), poly(vinyl chloride-diethyl maleate), poly(vinyl chloride-vinyl fluoride), poly(vinyl fluoride-vinylidene fluoride), and the like; and mixtures of homopolymers and-/or copolymers, for example, poly(vinyl chloride) and poly(chlorostyrene), poly(vinyl chloride) and poly(vinyl acetate), poly(vinyl chloride) and poly(vinylidene chloride) poly(vinyl chloride) and poly(vinyl ethyl ether), and the like. The vinyl chloride and vinylidene chloride polymers may contain from 0 to 50% by weight of at least one other vinylidene monomer copolymerized therewith. Suitable monomers include 1-olefins containing from 2 to 12 carbon atoms, such as ethylene, propylene, 1-hexene, and the like; dienes containing from 4 to 10 carbon atoms including conjugated dienes such as butadiene, isoprene, and the like; ethylidene norbornene and dicyclopentadiene; vinyl and allyl esters such as vinyl chloroacetate, allyl acetate, and the like; vinyl aromatics such as styrene, chlorostyrene, vinyl toluene, and the like; vinyl and allyl ethers and ketones such as vinyl methyl ether, allyl methyl ether, vinyl chloroethyl ether, methyl vinyl ketone, and the like; vinyl nitriles such as acrylonitrile, methacrylonitrile, and the like; cyanoalkyl acrylates such as alpha-cyanomethyl acrylate, the alpha-, beta-, and gamma-cyanopropyl acrylates, and the like; olefinically unsaturated carboxylic acids and esters thereof, including alpha, beta-olefinically unsaturated acids and esters thereof such as methyl acrylate, chloropropyl acrylate, beta-ethylhexyl acrylate, including esters of maleic and fumaric acid and the like; amides of the alpha, beta-olefinically unsaturated carboxylic acids such as acrylamide, and the like; divinyls, diacrylates, and other polyfunctional monomers such as divinyl benzene, divinyl ether, diethylene glycol diacrylate, allyl pentaerythritol, and the like; and bis(beta-haloalkyl) alkenyl phosphonates such as bis(beta-chloroethyl)vinyl phosphonate, and the like. Other halogenated polymers included in this invention are chlorosulfonated polyethylene, such as HYPALON and polymers of chloroprene, such as NEOPRENE rubber, both available from E. I. duPont de Nemours and Co.

The preferred halogenated polymers of this invention are poly(vinyl chloride) and poly(vinylidene chloride). When using copolymers or mixtures it is preferred that at least 50% by weight of the copolymer or mixture be derived from vinyl chloride and the remainder be derived from one or more of the above olefinic monomers.

The vinyl chloride and vinylidene chloride polymers may be intimately mixed with the smoke suppressant additive or mixture of additives in any convenient manner. For example, blenders or mixers that are known in the art may be employed using a variety of techniques. The additives are used in the range of 0.1 to about 30 parts for each 100 parts polymer and preferably from 1-15 parts are employed.

EXAMPLES

The following examples illustrate the present invention but are not intended to limit the invention thereto.

In the following examples, the smoke suppressants are mixed with the resin using first a Waring Blender and then a Brabender Plastograph or a plastic mill. The resulting sheets are pressed under pressure to give 3-inch × 3-inch plaques of 0.030-inch thickness. Thses specimens are burned in the NBS Smoke Chamber using the flaming mode in accordance with ASTM Special Technical Publication 422 (1969), NFPA 258-T "Smoke Generated by Solid Materials," May 1974, or ASTM E-662. The average of two or more values is reported.

EXAMPLES 1-7

Examples 1-7 demonstrate the surprising utility of zeolite compositions as smoke suppressants for poly(vinyl chloride) in the following standard rigid compound: 100 parts of poly(vinyl chloride)(homopolymer) was dry mixed with 2 weight parts of THERMOLITE 31-Super (M&T Chemicals, Inc.,), 1 part of a paraffin wax (ROSSWAX 165, F. B. Ross Co.), 3 parts of an acrylic processing aid, which is a thermoplastic acrylic polymer in the powder form to facilitate the processing of rigid polyvinyl chloride plastics into panels, pipes and ducts, (ACRYLOID K 120-ND, Rohm and Hass, Inc.), and the smoke suppressant additives as indicated (all amounts in parts by weight).

The Examples set forth in Table 1 illustrate the advantage of the inexpensive zeolite compositions of this invention over more expensive, commercially available, smoke suppressants (Examples 6 and 7) for poly(vinyl chloride).

TABLE 1

| Example No. | Additive Composition | phr | NBS Smoke Dmc | % Smoke Reduction |
| --- | --- | --- | --- | --- |
| 1 (Control) | None | — | 510 | 0 |
| 2 | Mordenite | 3 | 394 | 23 |
| 3 | Chabazite | 3 | 361 | 29 |
| 4 | Chabazite | 6 | 265 | 48 |
| 5 | Clinoptilolite | 3 | 281 | 45 |
| 6 | $MoO_3$ | 6 | 354 | 30 |
| 7 | Ferrocene | 6 | 358 | 30 |

EXAMPLE 8

An iron-exchanged zeolite containing 6.6% iron was prepared in an aqueous medium in an inert atmosphere as follows. A mixture of zeolite EZA* (100 g) from Ethyl Corp. in a deaerated ($N_2$) aqueous solution (700 ml) of $FeSO_4.7H_2O$ (35 g) was stirred under a $N_2$ atmosphere at 50° C. After 48 hrs., the mixture was filtered. The residue was washed thoroughly with distilled water, oven dried (70° C.) for 14 hr. and ground in a Waring Blender. The residue weighed 100 g.

*A crystalline type A sodium alumino silicate from Ethyl Corporation represented by the formula $Na_2O_3.Al_2O_3.2SiO_2.XH_2O$ where X=4.5

EXAMPLES 9-12

Examples 9-12 set forth in Table 2, using the rigid formulation described in Examples 1-7, illustrate the dramatic increase in smoke suppression gained by ion-exchange in a synthetic zeolite, in these examples by replacing sodium ions with ferrous ions.

TABLE 2

| Example No. | Zeolite | Ion-Exchanged With $FeSO_4$ | phr | NBS Smoke Dmc | % Smoke Reduction |
| --- | --- | --- | --- | --- | --- |
| 9 | EZA[a] | No | 6 | 522 | +11 |
| 10 | Zeolex-7[b] | No | 6 | 448 | 5 |
| 11 | $EZA_7$ | Yes[c] | 6 | 313 | 35 |
| 12 | Zeolex-7 | Yes[d] | 6 | 223 | 53 |

[a] A crystalline type A sodium alumino silicate from Ethyl Corporation represented by the formula $Na_2O.Al_2O_3.2SiO_2.XH_2O$ where X = 4.5
[b] A sodium alumino silicate from J. M. Huber Corporation, typically represented by the formula $Na_2O.Al_2O_3.13.5 SiO_2.X H_2O$ where X = 5
[c] Composition of Example 8.
[d] Ion-exchanged in a manner similar to that disclosed in Example 8 and containing 4.4% iron.

EXAMPLE 13

An iron-exchanged zeolite containing 5.7% iron was prepared in an aqueous medium as follows. A mixture of 300 g of ZEOLITE 1010A (Clinoptilolite) from The Anaconda Co. in a concentrated aqueous solution (500 ml) of NaCl was stirred at 40° C. over a period of 24 hours. After filtration, the residue was washed thoroughly with distilled water and oven dried at 90° C. for 14 hrs. A portion of this material (40 g) was stirred in an aqueous solution (200 ml) of FeSO$_4$.7H$_2$O (22 g) at 50° C. for a period of 2 days. After filtration, the residue was washed thoroughly with distilled water and oven dried at 90° C. for a period of 14 hrs. This material was ground in a Waring Blender and collected through a 115 mesh Tyler Equivalent sieve to afford 37 g of a fine tan powder.

EXAMPLES 14–20

The performance of these novel smoke suppressant compositions was also determined in flexible poly(vinyl chloride) using the following compound: 100 parts of poly(vinyl chloride) homopolymer (GEON EP103F-76, B. F. Goodrich) was drymixed with 5 parts of a lead silicate sulfate (TRIBASE XL, NL Industries, Inc.), 0.5 parts of a paraffin wax (ROSSWAX 165, F. B. Ross Co.), 30 parts of alumina trihydrate (#C330, Alcoa), 40 parts of a dialkyl phthalate (SANTICIZER 711, Monsanto), and the smoke suppressant additive as indicated (all amounts in parts by weight). Ion-exchange was accomplished in a manner similar to that described in Examples 8 and 13. The results obtained are set forth in Table 3 which demonstrates the smoke suppression efficiency of zeolites exchanged with a variety of metals.

TABLE 3

| Example No. | Zeolite | Exchanged Metal (Metal Content %) | phr | NBS Smoke Dmc | % Smoke Reduction |
|---|---|---|---|---|---|
| 14 | — | — | 0 | 300 | — |
| 15 | Clinoptilolite | Mn (1.3%) | 6 | 252 | 16 |
| 16 | Clinoptilolite | Mg (1.6%) | 6 | 237 | 21 |
| 17 | Clinoptilolite | Zn (3.3%) | 3 | 227 | 24 |
| 18 | Chabazite | Cu (2.5%) | 3 | 251 | 16 |
| 19 | Chabazite | Co (3.8%) | 3 | 224 | 25 |
| 20 | Chabazite | Fe (4.9%) | 3 | 195 | 35 |

EXAMPLES 21–28

Examples 21–28 set forth in Table 4, using the flexible formulation described in Examples 14–20 illustrate the surprising utility of these zeolite compositions in combination with other known smoke suppressant additives.

TABLE 4

| Example No. | Clinoptilolite | Fe-Exchanged[a] Clinoptilolite | CuCO$_3$ | MoO$_3$ | NBS Smoke Dmc | % Smoke Reduction |
|---|---|---|---|---|---|---|
| 21 | 6 | 0 | 0 | 0 | 229 | 23 |
| 22 | 0 | 1 | 0 | 0 | 219 | 27 |
| 23 | 0 | 2 | 0 | 0 | 221 | 27 |
| 24 | 0 | 3 | 0 | 0 | 190 | 37 |
| 25 | 0 | 0 | 1 | 0 | 220 | 27 |
| 26 | 0 | 0 | 0 | 1 | 198 | 33 |
| 27 | 0 | 3 | 0 | 1 | 180 | 40 |
| 28 | 0 | 3 | 1 | 1 | 127 | 58 |

[a] Composition of Example 13

We claim:

1. A composition comprising 100 parts by weight of a halogenated polymer and 0.1 to 30 parts by weight of a smoke suppressant selected from the group consisting of completely and partially metal-ion exchanged zeolites, both naturally occurring and synthetic, and mixtures thereof, wherein the exchanged metal is selected from from the group consisting of V, Mo, Mn, Fe, Co, Ni, Cu, Zn, Sb, Bi and mixtures thereof, the zeolite being represented by the general formula:

$$M_{2/n}O \cdot Al_2O_3 \cdot XSiO_2 \cdot YH_2O$$

where
M is a metal, selected from the group consisting of alkali and alkaline earth metals, V, Mo, Mn, Fe, Co, Ni, Cu, Zn, Sb, Bi and mixtures thereof;
n is the cation valence;
X lies between 0.1 and 20 inclusive
Y is the number of moles of water of crystallization and has a value of 0 to 20.

2. The composition of claim 1 wherein the halogenated polymer is poly(vinyl chloride) or poly(vinylidene chloride).

3. The composition of claim 1 wherein the halogenated polymer is chlorosulfonated polyethylene or polychloroprene.

4. The composition of claim 1 wherein said metal is selected from the group consisting of V, Mo, Mn, Fe, Co, Cu, Zn, Bi, and mixtures thereof.

5. The composition of claim 1 wherein said metal is selected from the group consisting of Mn, Fe, Co, Cu, Zn, and mixtures thereof.

6. The composition of claim 1 wherein said zeolites are in combination with 0.1–10 parts by weight of CuCO$_3$, or with 0.1–10 parts by weight of MoO$_3$, or mixtures thereof.

7. The composition of claim 6 wherein said zeolite is ion-exchanged with a water-soluble salt of iron.

8. The composition of claim 1 wherein the metal comprises 1–30% of the exchanged zeolite.

9. The composition of claim 1 wherein a stabilizer is present and the composition includes 6 to 30 parts by weight of said smoke suppressant.

10. The composition of claim 1 wherein the smoke suppressant is calcined at 200°–700° C. for a period of 1–10 hours.

11. A process for preparing a low smoke halogenated polymer using 0.1 to 30 parts by weight per 100 parts by weight of polymer of a smoke suppressant selected from the group consisting of completely and partially metal-ion exchanged zeolites, both naturally occurring and synthetic, and mixtures, wherein the exchanged metal is selected from the group consisting of V, Mo, Mn, Fe, Co, Ni, Cu, Zn, Sb, Bi, and mixtures thereof, the zeolite being represented by the general formula:

$$M_{2/n}O \cdot Al_2O_3 \cdot XSiO_2 \cdot YH_2O$$

where M is a metal, selected from the group consisting of alkali and alkaline earth metals, V, Mo, Mn, Fe, Co, Ni, Cu, Zn, Sb, Bi and mixtures thereof;

n is the cation valence;

X lies between 0.1 and 10, inclusive;

Y is the number of moles of water of crystallization and has a value of 0 to 20 inclusive.

12. The process of claim 11 wherein the halogenated polymer is poly(vinyl chloride).

13. The process of claim 11 wherein the halogenated polymer is chlorosulfonated polyethylene or polychloroprene.

14. The process of claim 11 wherein the metal comprises 1–30% of the exchanged zeolite.

15. The process of claim 11 wherein the smoke suppressant is calcined at 200°–700° C. for a period of 1–10 hours.

* * * * *